US005878837A

United States Patent [19]

Kistner

[11] Patent Number: 5,878,837

[45] Date of Patent: Mar. 9, 1999

[54] TOOL HOLDING APPARATUS

[76] Inventor: Joseph M. Kistner, 63 Bulls Head Rd., Clinton Corners, N.Y. 12514

[21] Appl. No.: 660,915

[22] Filed: Jun. 10, 1996

[51] Int. Cl.[6] .................................................. F16M 13/00

[52] U.S. Cl. .................................................. 182/129

[58] Field of Search .............................. 182/2.1–2.9, 2.11, 182/129, 63.1, 64.1, 65.1, 66.1, 66.2, 67.1–67.5, 68.1–68.3, 69.1–69.6; 248/316.7, 74.2

[56] References Cited

U.S. PATENT DOCUMENTS

| | | | |
|---|---|---|---|
| 2,322,753 | 6/1943 | Thomas | 248/279.15 |
| 3,146,853 | 9/1964 | Eckels | 182/2.4 |
| 3,163,880 | 1/1965 | Johnson | 182/2.7 |
| 3,319,739 | 5/1967 | Morse | 182/2.3 |
| 3,320,524 | 5/1967 | Miller | 182/2.4 |
| 4,466,506 | 8/1984 | Dolenti | 182/2.1 |
| 4,903,929 | 2/1990 | Hoffman | 248/229.15 |
| 4,979,945 | 12/1990 | Wade | 248/316.7 |
| 5,076,449 | 12/1991 | Clutter | 182/2.1 |
| 5,085,384 | 2/1992 | Kasubke | 248/74.2 |
| 5,524,327 | 6/1996 | Mickel | 248/316.7 |

*Primary Examiner*—Alvin Chin-Shue
*Attorney, Agent, or Firm*—George R. McGuire

[57] ABSTRACT

A tool holder for mounting on a boom lift bucket, the holder having a first and second plate rotatable with respect to each other and having a resilient tool engagement member mounted to the second plate.

19 Claims, 8 Drawing Sheets

TOOL HOLDING APPARATUS

SUMMARY OF THE INVENTION

My invention relates to means for holding or carrying tools or other implements, and more particularly, to convenient and safe means for supporting and handling tools, implements and other devices used by workers in a variety of circumstances. The invention was conceived in connection with an observed need to better and more safely support tools and implements used by electric utility linemen, but it will become evident as the description proceeds that the invention may find utility in a variety of generally similar environments, including those experienced by telephone linemen, tree and forestry workers, and the like.

Modern electric utility operations commonly involve the use by linemen of a variety of tools, often with a lineman standing in a hoisted bucket near one or more high-voltage lines to operate any of a variety of tools. Trees, or ice, or various other things may be present at the worker's workspace. Operations are often hampered by high winds and sleet or snow in the darkness of night. Many operations needed to maintain high-voltage lines desirably or necessarily must be performed using naturally clumsy procedures involving elongated tools, or tools carried on much-elongated handles, in order to protect the workers, as well as possible, against electric shock. In addition to the problem of protecting workers hoisted to positions near high-voltage lines, electric utility maintenance and repair work also frequently results in injury and danger to associated personnel on the ground, as when tools are accidentally dropped, for example.

A lineman aloft in a plastic bucket near high-voltage lines frequently faces a variety of very tempting but extremely dangerous choices. The plastic bucket in which he stands offers a pair of upper edges on which he seemingly might conveniently lay an elongated tool, but if he does so, an unsecured tool can fall, causing damage or injury to objects or persons below. It is important to note that the troubled areas in which linemen must work are extremely varied. On one job tree limbs may be just below the power lines, on another job just above the power lines, and on the next job mixed among the power lines. The wide variety of conditions encountered during power-line work lessen opportunities to build temporary shelters or temporary tools which sometimes might be useful.

In accordance with one concept of the present invention I choose to provide one or more simple spring clips into which one or more elongated tools may be "plugged" and "unplugged" as such tools are used and then stored. The broad idea of providing simple spring clips for elongated tools is very old for tools fixedly stored in completely safe environments, such as above a basement workbench, and also well known for mounting garden tools fixedly stored in a garage, but tends to unknown for tools being used in the dangerous and adverse environment which accompanies electric power utility work. Even if conditions allow a selected side of the plastic bucket carrying a lineman to be continuously presented to the area where work must be done, various conditions may make it necessary or highly desirable that a tool not being used be kept in a very precise position at a very precise place before or after it has been used. For example, to avoid having an elongated tool reach across a power line, it may be desirable that it lie substantially parallel to the power line and spaced therefrom. In order to extend parallel to the power line, the tool may have to extend at a very unpredictable angle with respect to the bucket in which the lineman stands. One important object of the present invention is to provide an improved tool holder which may be readily adjusted to securely hold one or a plurality of elongated tools in a selected one of many possible positions.

It is quite advantageous to provide a tool-clamping device which will allow a lineman to conveniently "plug" and "unplug" a tool without a need for tedious operations, but supremely important that a tool not be likely to fall from the work area. Another object of the invention is to provide a tool clamping means which affords an extra measure of safety, so that even if a tool accidentally becomes partially "unplugged", it will still likely be retained and not likely to fall so as to endanger a worker.

Various utility operations are presently made more tedious or time consuming by a need to raise a series of successive tools, some or all of which comprise elongated shafts, from positions on the ground to a lineman aloft in a bucket. One further object of the present invention is to provide means by which one or a selected plurality of elongated tools may be conveniently clamped securely on a plastic bucket or workman platform holder by a workman on the ground, with the elongated tools then extending in a largely horizontal direction, with the holder made to allow the tools to swing together to extend in increasingly vertical direction as the holder or workman platform is raised up to the working level of a lineman aloft, and made to hold the plurality of tools reliably in that position as various of the tools are extracted by the lineman from the holder, used, and then replaced in the holder.

While the invention will be described mainly in connection with situations encountered by electric power linemen, it will be apparent that the invention should be useful as well to telephone and video cable linemen, tree pruners, and the like, and to any worker finding it necessary to perform similar operations with tools under similar circumstances. A wide variety of spring clips have been provided in the prior art to hold broom and rake handles, for example, but none have proven useful and reliable enough to have gained widespread usage. Various techniques which are suitable for holding a tool on a basement or garage wall become unsuitable for holding a tool near a lineman's bucket.

Other objects of the invention will in part be obvious and will in part appear hereinafter. The invention accordingly comprises the features of construction, combinations of elements, and arrangements of parts, which will be exemplified in the constructions set forth, and the scope of the invention will be indicated in the claims.

For a fuller understanding of the nature and objects of the invention, reference should be had to the following detailed description taken in connection with the accompanying drawings, in which:

DETAILED DESCRIPTION OF THE INVENTION

Figure 1:
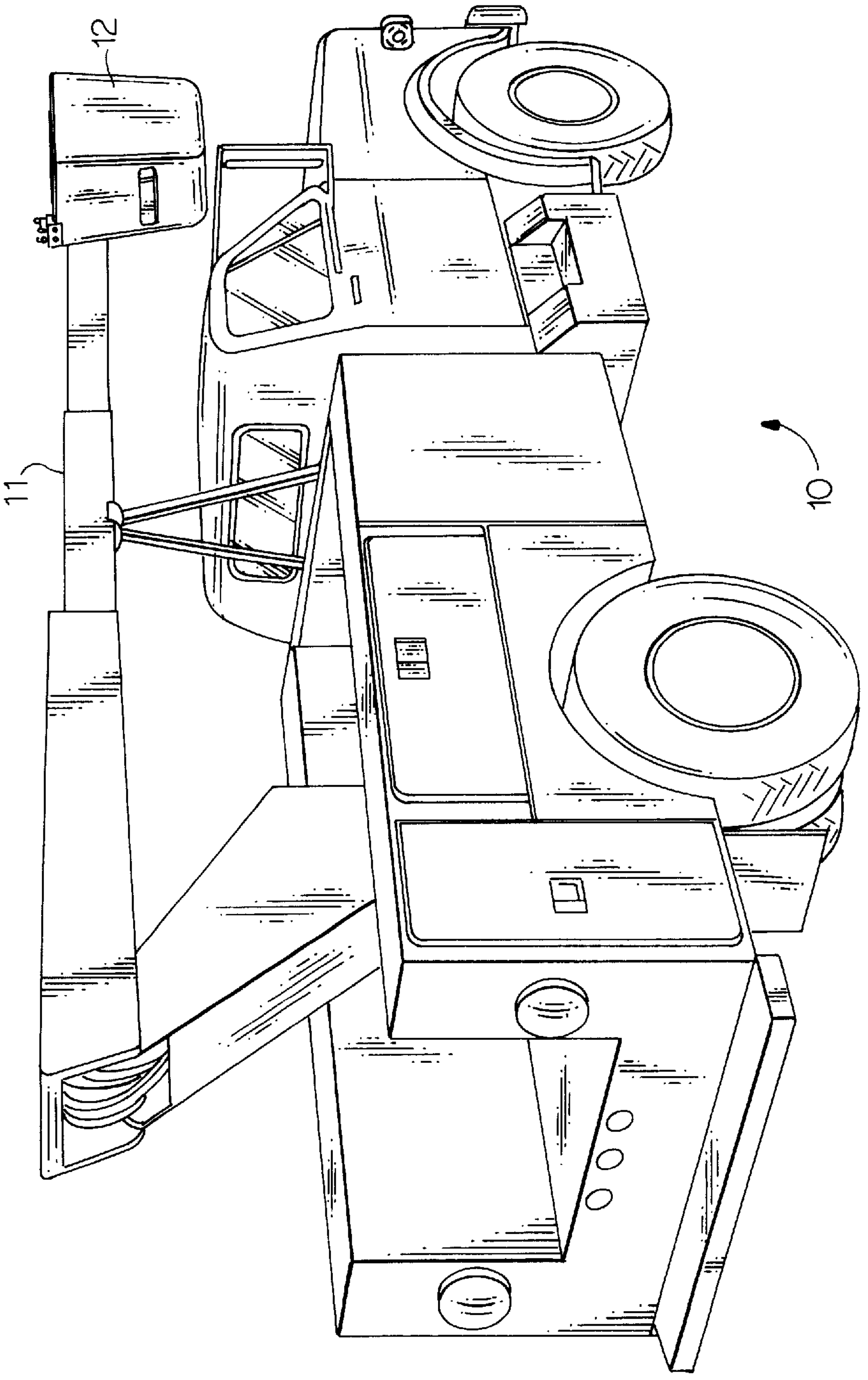
FIG. 1 is a perspective view of a typical prior art truck equipped with a bucket hoist with which various forms of the invention are principally intended to be used.

Referring generally to the Figures, FIG. 1 shows a typical utility truck 10 having a hydraulically-operable boom 11 adapted to move a plastic bucket 12 forming a hoistable work station in which a power lineman, or other similar worker may stand to perform work. The present invention need not involve any changes in the truck or its hydraulic control system. Nor does the present invention necessarily require any changes in the bucket 12, although it will become apparent as the description proceeds that various parts of the present invention may be either fashioned to be attached to buckets presently in use, or, if desired, fabricated together with buckets of various types made in the future.

Figure 1A:
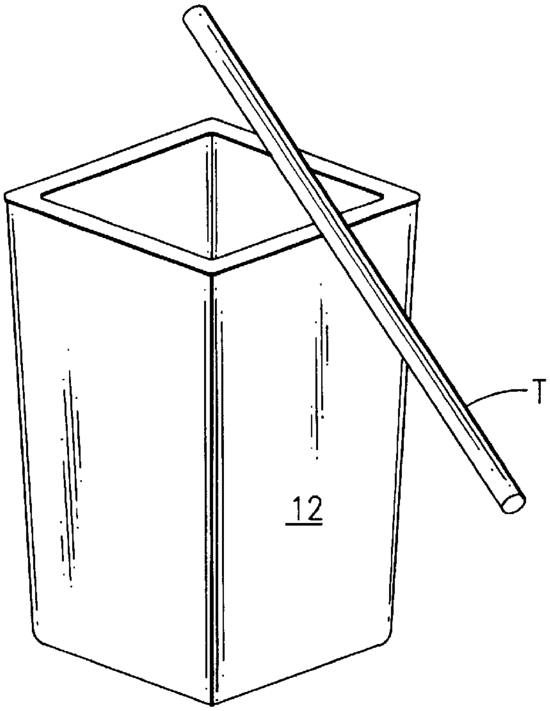
FIG.1a Prior Art
FIG. 1*a* is an elementary isometric view used to illustrate a dangerous prior art practice.

As shown in FIG. 1*a* to represent a prior art practice, an elongated tool T may be laid across the upper edge of bucket 12, across a corner, for example, to very conveniently support the tool while the workman (not shown) is not holding the tool. However, it is important to note that attempting to support the tool in such a manner is a procedure fraught with danger, since the tool may roll or fall and injure either the workman or an associate on the ground. FIGS. 1*a*, 2 and 2*a*–2*c* show important portions of one form of the present invention wherein one or plural elongated tools may be supported safely, in generally a horizontal position atop the lineman's bucket 12. Bracket means 13 (FIG. 2) comprises a pair of generally U-shaped bracket pieces 13*a* and 13*b* (See FIG. 8) which are bolted to clamp the upper lip 12*a* of bucket 12, as by means of bolts 14*c*, 14*c*. The bracket means 13 in turn carries lower circular plate 15, which is permanently affixed to bracket means 13 by bolts or welding (not shown), for example. Lower plate 15 supports a circular upper plate 16 in any one of a plurality of desired angular positions spaced about a generally vertically-extending axis. As best understood by reference to FIGS. 2*a* and 2*b*, lower plate 15 is shown with an annular shape and provided with a threaded central bore 15*a*, which is shown partly filled by a threaded bolt 17. Lower plate 15 is also provided with eight holes or recesses 15*b*, 15*b* spaced equally around the central axis of plates 15 and 16 and bolt 17, and provided with a central upper recess 15*c*. A threaded boss 18 welded to lower plate 15 receives the end of bolt 17 as bolt 17 is threaded further into plate 15 and boss 18. Bracket means 13 (FIGS. 2, 8) has a rectangular hole (not shown) into which boss 18 fits.

Circular upper plate 16 has an unthreaded central bore 16*d* through which bolt 17 slidingly passes. Upper plate 16 is provided with eight pins or stub shafts 16*c*, 16*c* also spaced equally about the central axis of the plates 15, 16 at the same radial position as that of pins 16*c*, 16*c*. Bolt 17 is provided with a pair of collars 16*a*, 16*b* welded to the bolt on opposite sides of upper plate 16, whereby plate 16 may be moved up and down relative to lower plate 15 (as viewed in FIG. 2*b*) by retraction or advancement of bolt 17, but with plate 16 generally free to rotate relative to bolt 17. However, when plate 16 is angularly moved to one of the eight angular positions at which the pins 16*c*, 16*c* of plate 16 register with the eight holes 15*b*, 15*b* of lower plate 15, rotation of bolt 17 may insure advancement of the eight pins into the eight recesses, moving plates 15 and 16 together and securely preventing any rotation of upper plate 16 and the tool clamps mounted thereon, relative to lower plate 15 and the workplace bucket 12. When the plates 15, 16 move together, collar 16*b* seats within upper recess 15*c* of plate 15. With the eight holes shown by way of example, it will be apparent that the workman has a choice of eight angular positions (22.5 degrees apart) in which he may lock a tool clamp. It will be apparent that more or less positions may be provided without departing from the invention. It is not necessary that plates 15 and 16 be circular, although it is desirable that they not present sharp corners. Plate 16 has been shown having a diameter slightly greater than that of plate 15 solely to facilitate better illustration.

Figure 2:
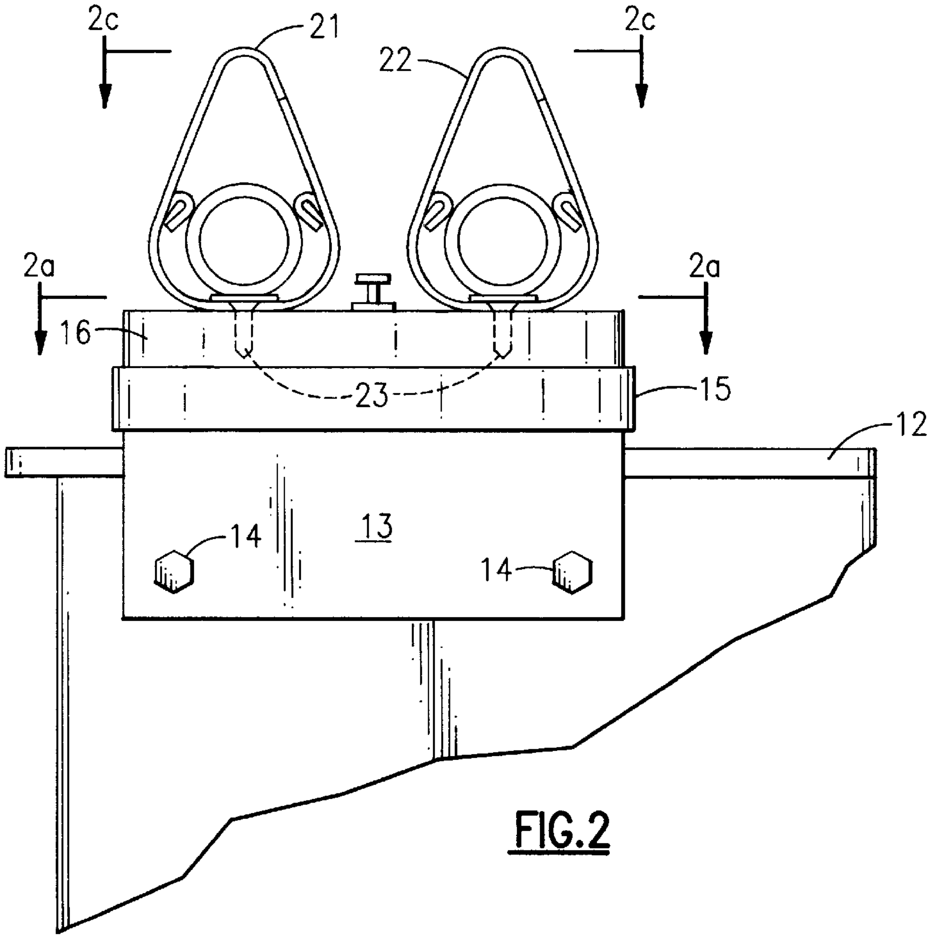
FIG. 2 is a side elevation view showing a first form of the present invention mounted on a plastic bucket shown in fragmentary form.
Figure 2A:
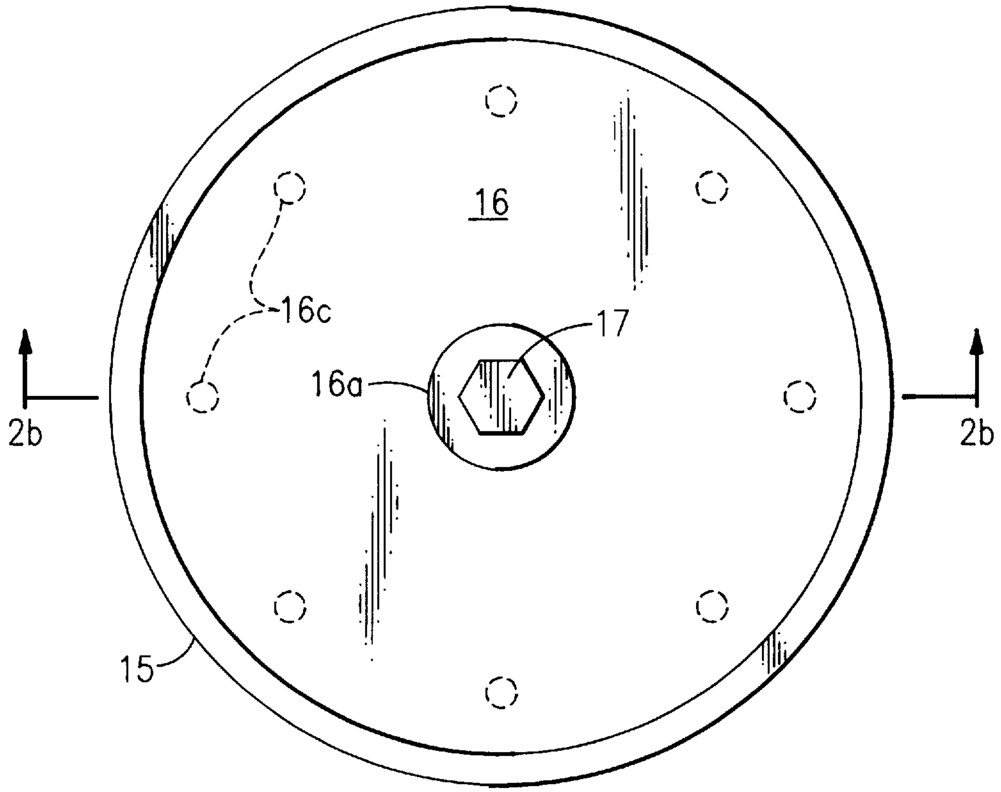
FIG. 2*a* is a downward view taken at lines 2*a*—2*a* in FIG. 2.
Figure 2B:
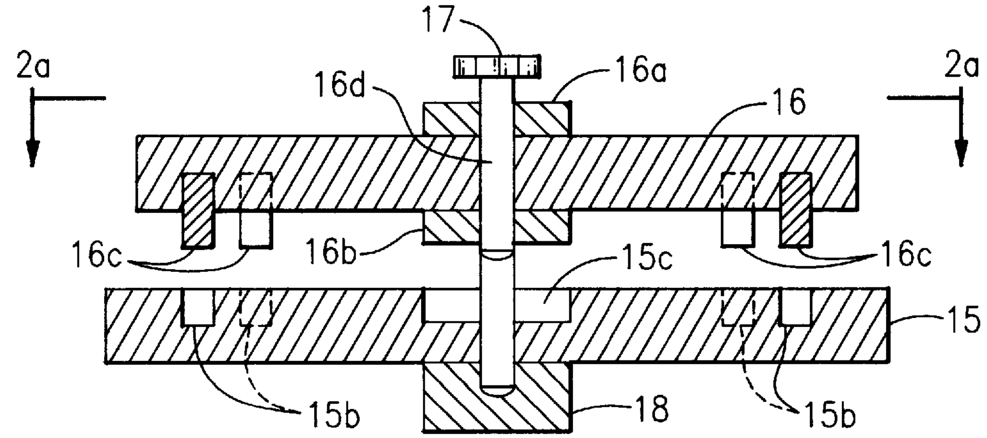
FIG. 2*b* is a sectional elevational view taken at lines 2*b*—2*b* in FIG. 2*a*.
Figure 2C:
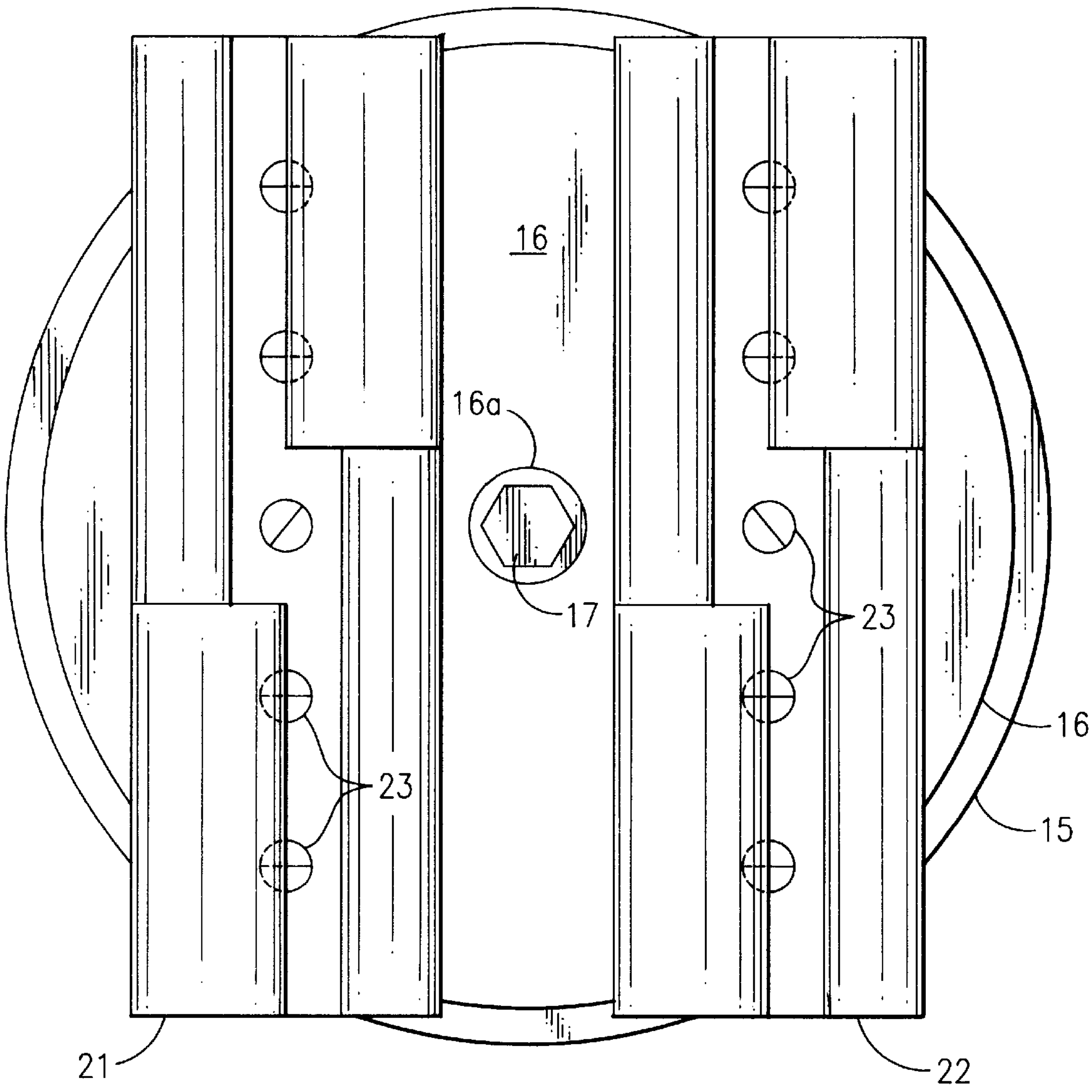
FIG. 2*c* is a downward top view taken at lines 2*c*—2*c* in FIG. 2, the clamp apparatus shown in FIGS. 2 and 2*a*–2*c* being angularly adjustable about a generally vertical axis.
Figure 3:
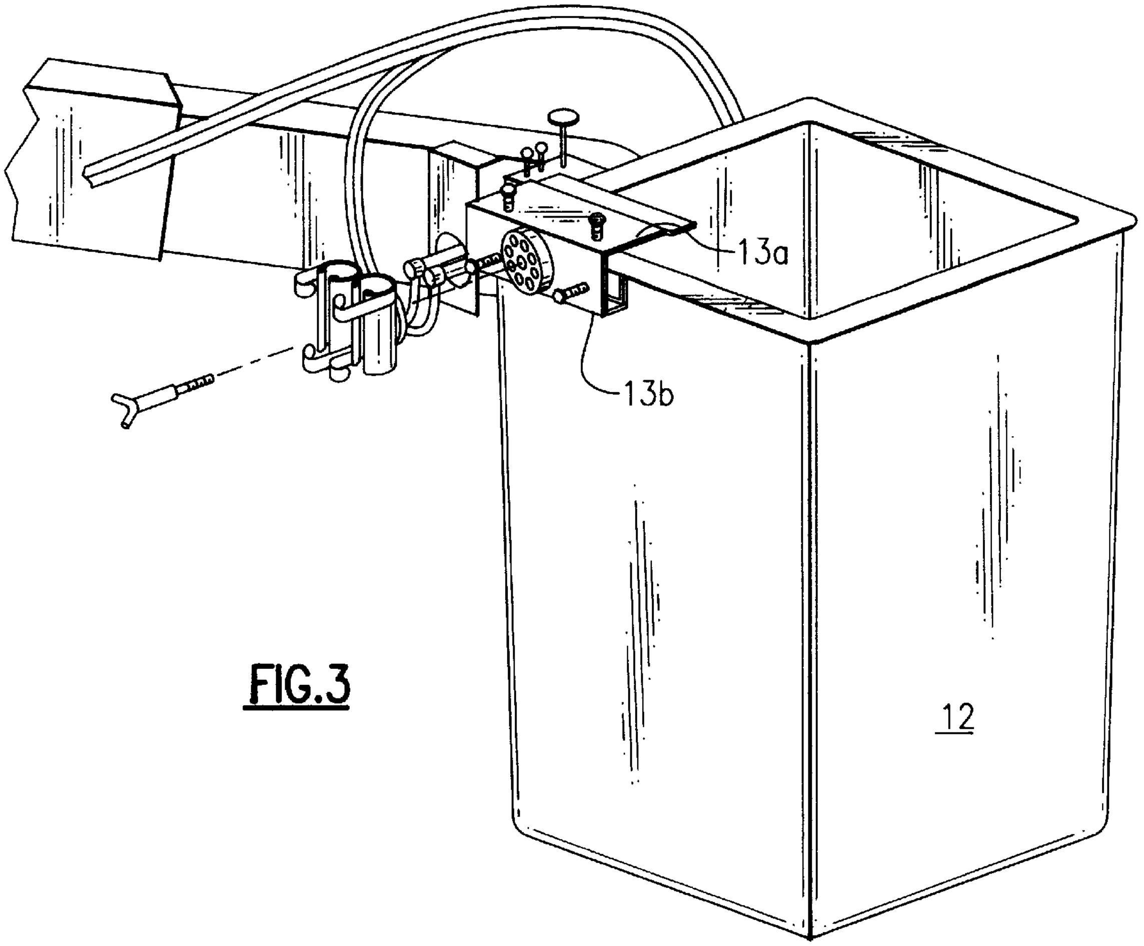
FIG. 3 is an isometric view illustrating a second form of the invention wherein the clamp apparatus is angularly adjustable about a generally horizontal axis. The device intended to be illustrated in FIG. 3 may be essentially identical to the device of FIGS. 2 and 2*a*–2*c* except that it is mounted on the side of a bucket for rotatable adjustment of a tool about a generally horizontal axis.

As seen in FIGS. 2 and 2*c*, tool clamp assemblies 21 and 22 are fixedly attached to upper plate 16, as by means of plural countersunk mounting screws 23,23. Each clamp assembly is capable of securely holding an individual elongated tool (not shown), and each such assembly is somewhat resilient, allowing various tools having shafts of differing diameters to be accommodated. Each tube assembly 21,22 may be made from a suitable high-strength plastic, or from a metal sheet, such as steel sheet. Importantly, the elongated tool (not shown) supported in a given one of the clamp assemblies is largely, though not completely, protected from accidental removal. Referring now to FIG. 6, as well as to FIGS. 2 and 5, each clamp assembly will be seen to comprise a generally tubular lower section best shown situated on an X axis in FIG.6. A tool handle of normal or expected diameter will tend to snugly fill that tubular section, tending to temporarily press the inwardly curled flange 31 radially outwardly against the resilience of the assembly, thereby holding the tool in place. The tool can be dislodged from that tubular section by many different accidental types of forces. However, forces which act to remove the tool completely from the clamp assembly are types of forces which are unlikely to occur, except in most fortuitous circumstances. Sufficiently strong pulls or pushes on an elongated tool can remove some or all of the tool from the mentioned tubular space, but even after that has been done, one or both of the outer spring flanges 32, 33 will still retain the tool against falling free, or even moving very far. In order to remove the tool, one must first not only urge it from the mentioned tubular section, but then rotate it by a somewhat precise amount before applying a further urging of the tool away from the clamping assembly. In order to install a tool initially into such a clamp assembly, as shown in FIG. 6 the tool must be aligned largely perpendicularly to axis x while situated about midway between spring flanges 32, 33, next pushed in between those flanges, next further rotated about 90 relative degrees to a position about parallel to axis x, and then finally urged into the mentioned tubular gripping position. The probability that accidental forces will act in precisely the opposite sequence needed to free the tool is so small as to be practically negligible. While one must rotate a tool roughly 90 degrees in order to initially install the tool into the holder, it is by no means necessary that one must turn the tool so as to extend it into dangerous territory, since the rotative capabilities of the clamping apparatus, with its eight-position (for example) selectivity allows the workman to avoid pointing a tool toward a high tension line, for example, since he can simply rotate the clamp to a desired safe position. In order to rotate the upper plate 16 and the one or more clamps it carries to a desired one of the eight positions, the workman need merely back off bolt 17 to unthread its lower end from plate 15 and boss 18, then lift the tool or tools (if installed) and the clamp assemblies, along with upper plate 16 enough that the pins 16*c*, 16*c* exit from recesses 15*b*, 15*b*, whereupon the upper plate may be rotated at will relative to the lower plate.

Figure 7:
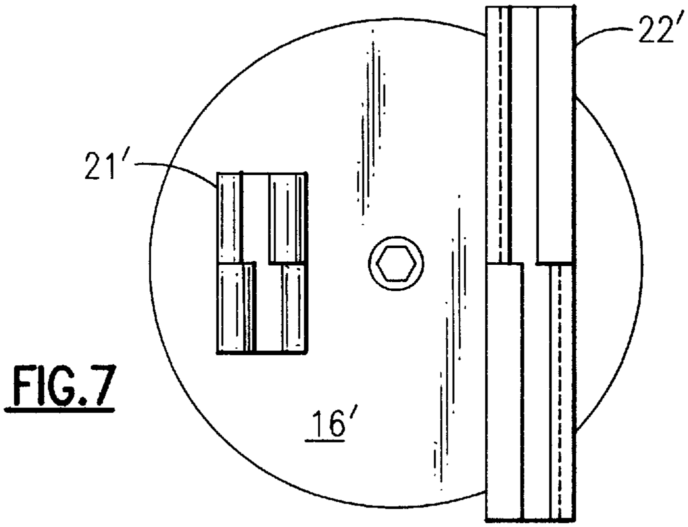
FIG. 7 is a top view of a modified form of cable clamp assembly wherein clamps of considerably differing sizes are utilized.

As shown in FIG. 7, a given angularly-adjustable tool carrier need not use two or more tool clamps which are identical to each other, and for various applications it will be desirable to provide clamping means of different sizes, as is suggested by clamps 21' and 22' shown atop plate 16' in FIG. 7. While a pair of tool clamps are shown installed together atop plate 16, it is important to note that the clamps usually act individually, and a single clamp ordinarily will be installed atop a plate like 16 for some applications, as when a large and wide clamp is needed to support a heavy tool. It is quite possible, however, and within the scope of the invention, to hold a given tool simultaneously by two clamps carried on the same angularly adjustable plate. The two arms of a very heavy cable-cutter tool can be so supported, for example. It should be noted that while the clamps have been shown specially formed to advantageously grip elongated generally-cylindrical tool handles, the clamps advantageously may be used with various other tools, even if a device which must be clamped must be temporarily lashed to such a clamp, for example.

Figure 4:
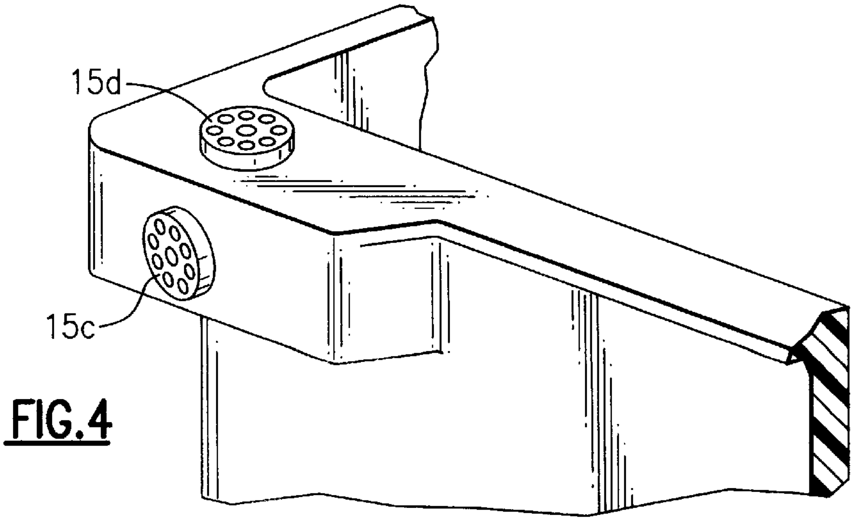
FIG. 4 is a fragmentary view of a plastic bucket equipped with portions of two tool holders according to the invention affixed to the bucket.

In the fragmentary view of a plastic bucket shown in FIG. 4, a pair of plates 15*d* and 15*e* are shown affixed to the bucket, being molded therein, for example, rather than mounted via a mounting bracket. Each of plates 15*d*, 15*e* corresponds in main principle to plate 15 of FIGS. 2 and 2*a*–2*c*, and may be fitted with a respective plate like plate 16 and respective clamps like clamps 21,22 of FIGS. 2, 2*c* and 6. Plate 15*d* of FIG. 4, like plate 15 of FIG. 2, allows a tool to be adjustably rotated about a generally vertical axis, but plate 15*e* mounted on the side of the bucket in FIG. 4 instead allows a tool to be adjustably rotated about a generally horizontal axis.

Figure 5:
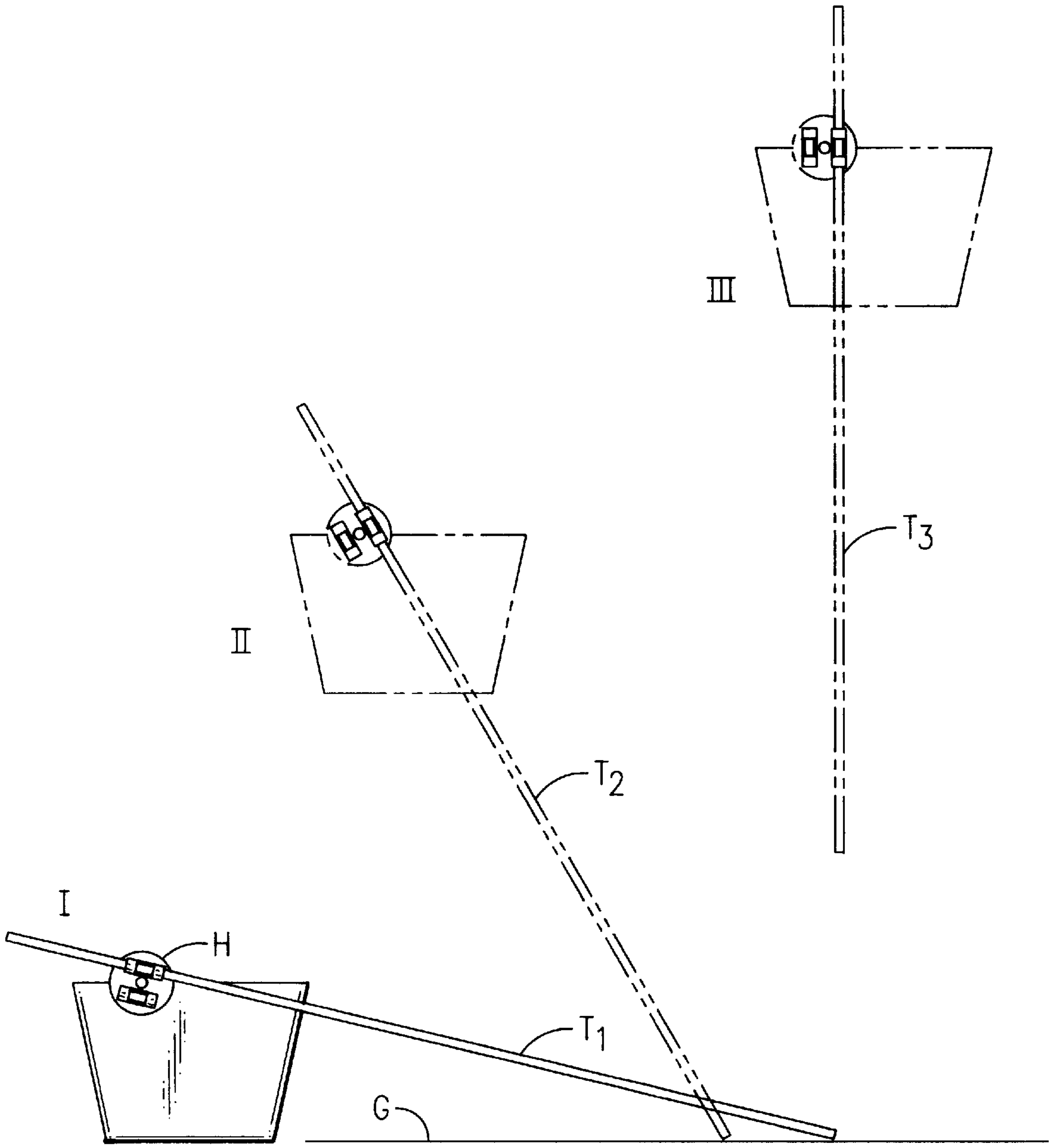
FIG. 5 is a diagram comprising three progressive views illustrating the raising of an elongated tool, using the form of the invention illustrated in FIG. 3.
Figure 6:
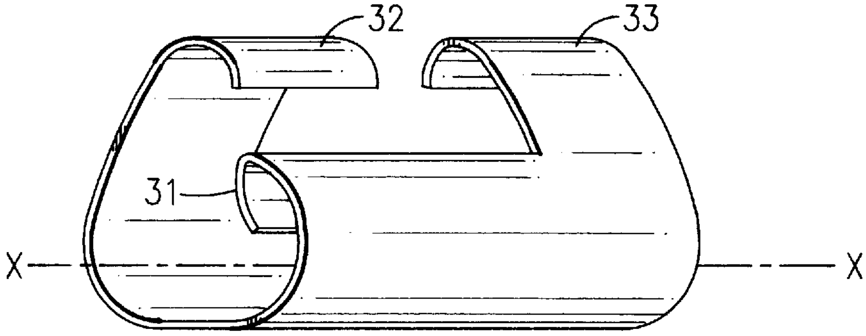
FIG. 6 is an isometric view of an exemplary tool clamp used in several forms of the invention.

FIG. 5 is a diagram showing an elongated tool T in three successive positions I, II and III, where it is shown labeled T1, T2 or T3, respectively, and assumed to be held by the modified tool holder H on hoistable bucket B. In the view at I bucket B rests on the ground G. It will be understood that with the bucket resting on the ground, a lineman, or more likely an assistant standing or kneeling on the ground can quite conveniently affix the tool, near one of its ends, to tool holder H. One end of the tool can lie on the ground, so that only a fraction of its weight need be lifted. It is usually desirable to attach the holder fairly near one end of the elongated tool, to insure that a major portion of the weight of the tool lies on one side of the holder H and tends initially to press atop the ground. The holder H is initially put in its unlocked condition, so that the tool can be rotated relative to holder H and bucket B. However, with the end of the tool resting on the ground there is, of course, no initial tendency for the tool to rotate. But as the bucket B then is gradually raised up vertically, with the center-of-gravity of the tool located rightwardly (as viewed in FIG. 5) from holder H, it will become apparent that the lower end of the tool will gradually swing leftwardly (as viewed in FIG. 5) and scrape lightly along the ground, toward the configuration seen at view II in FIG. 5. Then as bucket B is further lifted, it will be seen that the tool end will eventually lift clear of the ground, and the tool will, in general, point straight downward, in the case of a simple tool which is largely a straight length. Thus a heavy tool may be initially clamped by a person on the ground, and then raised by the hoist, wholly avoiding the dangers associated with a person on the ground lifting a heavy tool, and pointing it up toward a workman aloft to where that workman can grab it. Numerous accidents have occurred when one workman attempts to hand a tool to another workman. While the FIG. 5 diagram shows a single tool carried by holder, it will be apparent that plural tools may be carried if the clamping assemblies are installed in pairs as shown above.

Figure 8:
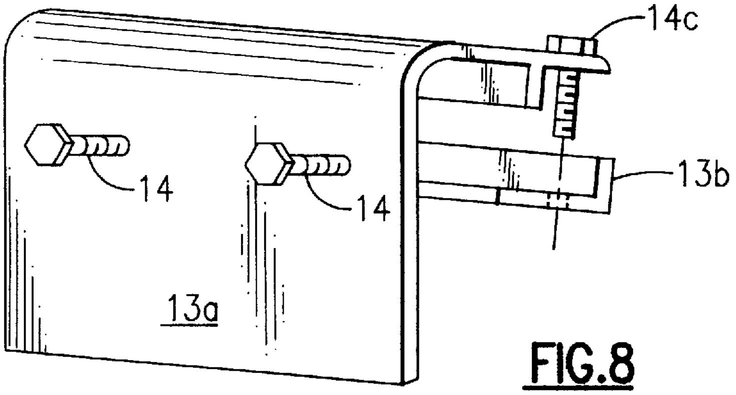
FIG. 8 is an isometric view of one simple form of bracket assembly which may be used to affix one or more of the embodiments of the invention to the upper rim of a common form of plastic bucket.
Figure 9A:
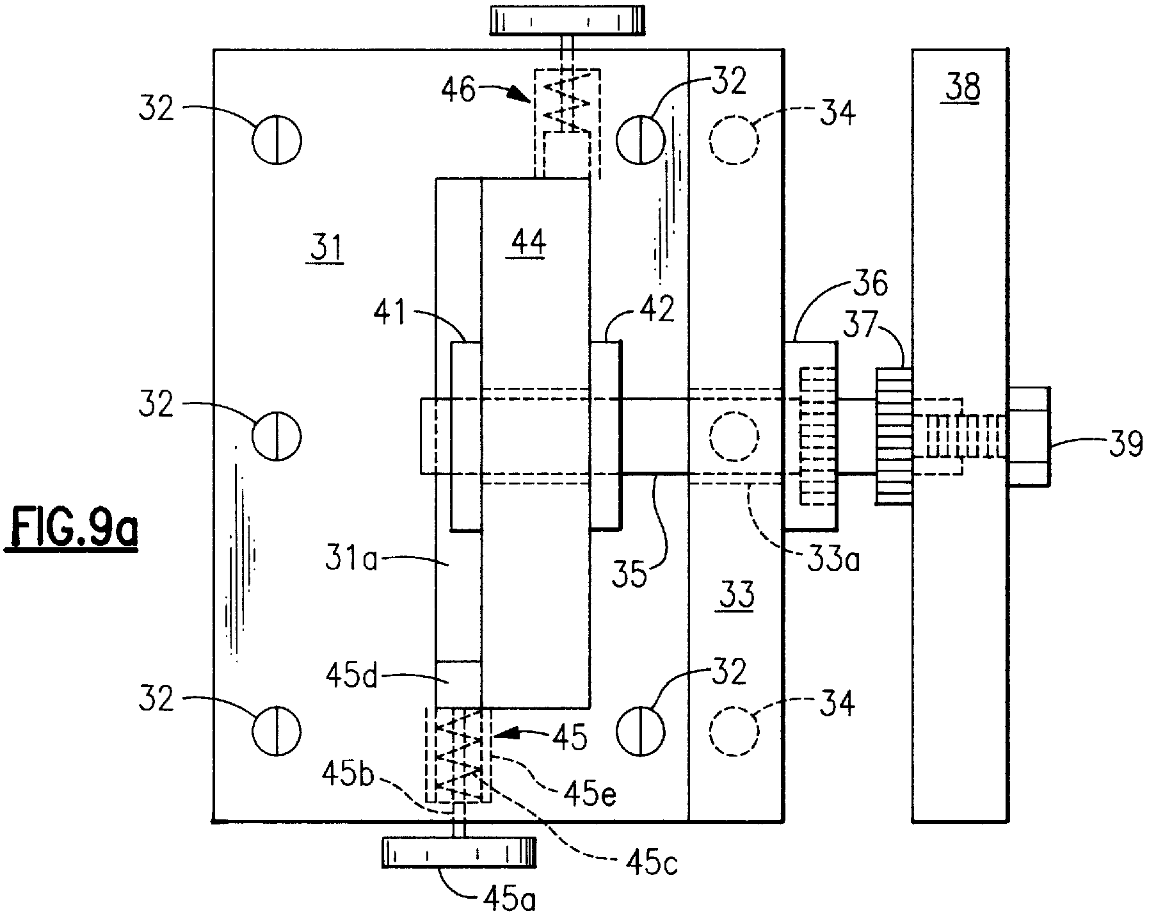
FIG. 9*a* is plan view of a further embodiment of the invention which is selectively rotatable about a generally horizontally extending axis and operable to position a plurality of clamps.
Figure 9B:
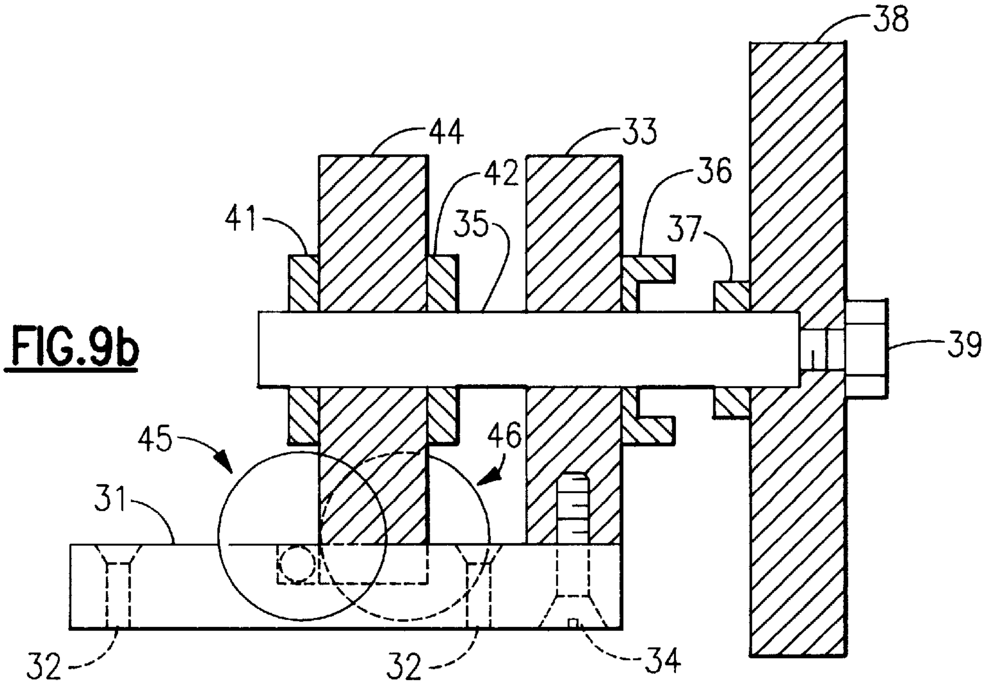
FIG. 9*b* is a view taken at lines 9*b*—9*b* in FIG. 9*a*.

Referring now to the modified form of device shown in FIGS. 9*a* and 9*b*, the base plate 31 of the device may be welded or bolted to the flat upper section of plate 13*a* of the bracket assembly shown in FIG. 8, so as to support the device atop the rim of a plastic bucket (not shown). In FIG. 9*b* screws 32, 32 are shown provided for such a purpose. As best seen in FIGS. 9*a* and 9*b*, base plate 31 supports an upstanding stationary bracket plate 33 which is held screwed to plate 31 by screws 34, 34. Plate 33 includes a horizontally extending bore 33*a* through which a rotating and reciprocating shaft 35 is shown situated. An internally toothed ring gear 36 is mounted concentric to shaft 35 and is welded or otherwise affixed to plate 33. Shaft 35 rotatably and reciprocatingly extends through ring gear 36 with its rightward (in FIG. 9*a*) end bolted to circular plate 38 by bolt 39. Spur gear 37 is mounted on and fixed to shaft 35. Circular plate 38 corresponds in principle to upper plate 16 of FIG. 2 in that it may carry one or several tool clamps, such clamps being omitted from FIGS. 9*a* and 9*b* for sake of clarity. It should be noted at this point that when spur gear 37 does not engage ring gear 36, clamp plate 38 may rotate freely about the axis of shaft 35.

Snap rings 41 and 42 spaced apart on shaft 35 axially fix the position of plate 44 on shaft 35, but shaft 35 may rotate relative to plate 44, of course. The lower end of plate 44 extends into and reciprocates back and forth in a slot 31*a* in base plate 31. Plate 44 is shown at its rightward limit of travel relative to base plate 31, with the ring and spur gears 36, 37 disengaged, and with plunger assembly 45 extended to prevent leftward (in FIGS. 9*a* and 9*b*) movement of clamp plate 38 and shaft 35. Plunger assembly 45 comprises a knob 45*a* with a shaft 45*b* having a metal stop block 45*d* on the end of the shaft, and a compression spring 45*c* on the shaft within a bore 45*e* which communicates with recess or slot 31*a* in the base plate 31. In the "unlocked" condition shown, spring 45*c* is extended to its relaxed condition, and stop block 45*d* nests in slot 31*a* in the base plate in front of plate 44, preventing any leftward (in FIGS. 9*a*, 9*b*) movement of plates 38, 44 and shaft 35 even if accidental forces were to urge leftward movement of those parts. In order to move the device to the "locked" position after he has selected the angle at which he wants the tools to extend, the workman pulls out knob 45*a* of assembly 45, removing stop block 45*d* from recess 31*a* of base plate 31 back into bore 45*e*. Then plate 44, shaft 35 and clamp plate 38 all may be urged leftwardly, with the stop block of further plunger assembly 46 eventually snapping into recess 31*a* as plate 44 moves sufficiently leftwardly. Plate 38 and shaft 35 may need to be rotated a small amount from the exact angle chosen, to allow gears 36, 37 to mesh. Plate 44 will seat against the leftward edge of recess 31*a*, and upon release of knob 45*a* its associated stop block will seat inactively against plate 44. Then the device will remain in that "locked" condition until further action by the workman.

While the invention has been described principally in connection with a work station wherein a workman aloft has been stationed within a bucket, it will become apparent that the invention is readily applicable to a variety of other workman platforms, such as various types used with aerial lift equipment, or fire departments, or bridge or structural steel painters.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

The embodiments of the invention in which an exclusive property or privilege is claimed are defined as follows:

1. An improved tool holder for mounting upon a boom lift bucket at a lineman's workplace to temporarily support at least one elongated, manually manipulated lineman's tool while the latter is not in use, said tool holder comprising:

a) a first plate having a first, planar surface;

b) first mounting means for securely attaching said first plate to a fixed support;

c) a second plate having a second, planar surface;

d) second mounting means for connecting said second plate to said first plate for selective movement of said second plate between first and second positions wherein said second, planar surface is in contacting and spaced relation, respectively, to said first, planar surface, and for rotational movement of said second plate relative to said first plate about an axis perpendicular to said second, planar surface when said second plate is in said second position;

e) detent means for preventing relative rotational movement of said first and second plates when said second plate is in said first position;

f) at least one tool engaging member having an engagement portion adapted to engage and support a tool placed manually therein; and g) third mounting means for directly connecting said tool engagement member to said second plate with said tool engagement member extending outwardly from and generally perpendicular to said second planar surface.

2. The tool holder of claim 1 wherein said first mounting means comprises a bracket fixedly attached to said first plate.

3. The tool holder of claim 1 wherein said engagement portion includes at least one resilient member defining a substantially tubular, tool-mounting space having a longitudinal axis in a plane substantially parallel to said second, planar surface, whereby an elongated tool may be placed at least partially within said tool-mounting space with the axis of elongation of said elongated lineman's tool substantially parallel to said second, planar surface.

4. The tool holder of claim 3 wherein said tool engaging member is threadedly connected to said second plate in a threaded recess extending into said second, planar surface.

5. The tool holder of claim 1 wherein said second plate is linearly movable between said first and second positions.

6. The tool holder of claim 5 wherein said second mounting means comprises a threaded member having a central axis and being rotatable to move said second plate along said central axis between said first and second positions.

7. The tool holder of claim 6 wherein said second plate is rotatable about said central axis when in said second position.

8. The tool holder of claim 7 wherein said first and second plates are circular and both are coaxial with said central axis.

9. The tool holder of claim 6 wherein said first plate includes a threaded opening extending into said first, planar surface, said second plate includes a through opening and said threaded member comprises a bolt extending loosely through said through opening and threadedly engaged in said threaded opening for axial movement of said bolt relative to said first plate by rotation of said bolt.

10. The tool holder of claim 9 and further including first and second collar members fixedly attached to said bolt on opposite sides of said second plate, whereby said second plate is moved together with said bolt as the latter is rotated and moved axially relative to said first plate.

11. The tool holder of claim 1 wherein said detent means comprises a first plurality of openings in one of said first, planar and second, planar surfaces, and a second plurality of pins extending outwardly from the other of said first, planar and second, planar surfaces, said openings and pins being symmetrically arranged for mutual engagement in any one of a plurality of relative rotational orientations of said first and second plates when said second plate is in said second position.

12. The tool holder of claim 11 wherein said first and second plates are circular, having a common central axis, and said openings and pins have centers equally spaced radially from and angularly about said central axis.

13. The tool holder of claim 12 wherein at least two of said tool engaging members are directly connected to said second plate, said engagement portion of each of said engaging members having at least one resilient portion of substantially tubular configuration defining a tool-placement space with an elongated axis in a plane substantially parallel to said second surface.

14. The tool holder of claim 1 wherein said second mounting means include support means for holding said second plate in said second position until selective movement thereof to said first position.

15. The tool holder of claim 14 wherein said second mounting means comprises a rod extending through a through opening in said second plate and said support means comprises a collar fixedly attached to said rod in substantially engaging relation with said second, planar surface, said second plate being freely rotatable relative to said rod and collar.

16. The tool holder of claim 15 and further including a threaded bore extending into said first plate, said rod having a threaded end portion engaged in said bore for reciprocal, axial movement of said rod in response to rotation thereof in opposite directions.

17. The tool holder of claim 16 and further including a recess extending into said first surface and having a base surface into which said threaded bore extends, said collar being positioned within said recess when said second plate is in said first position.

18. The tool holder of claim 17 wherein said second mounting means further includes a second collar fixedly attached to said rod in substantially engaging relation with a third surface of said second plate, whereby rotation of said rod in opposite directions causes said collars to move said second plate between said first and second positions.

19. The tool holder of claim 18 wherein said first and second plates are round, each having a central axis, and said rod, said threaded bore, said recess and said through opening are all coaxial with said central axis.

* * * * *